C. A. TRIPP.
CORN CRISP APPARATUS.
APPLICATION FILED JUNE 19, 1916.

1,294,971.

Patented Feb. 18, 1919.
2 SHEETS—SHEET 1.

WITNESSES:
J. H. Swan
J. H. Wells

INVENTOR
CHARLES A. TRIPP
BY
Lockwood & Lockwood
ATTORNEYS

C. A. TRIPP.
CORN CRISP APPARATUS.
APPLICATION FILED JUNE 19, 1916.
1,294,971.
Patented Feb. 18, 1919.
2 SHEETS—SHEET 2.
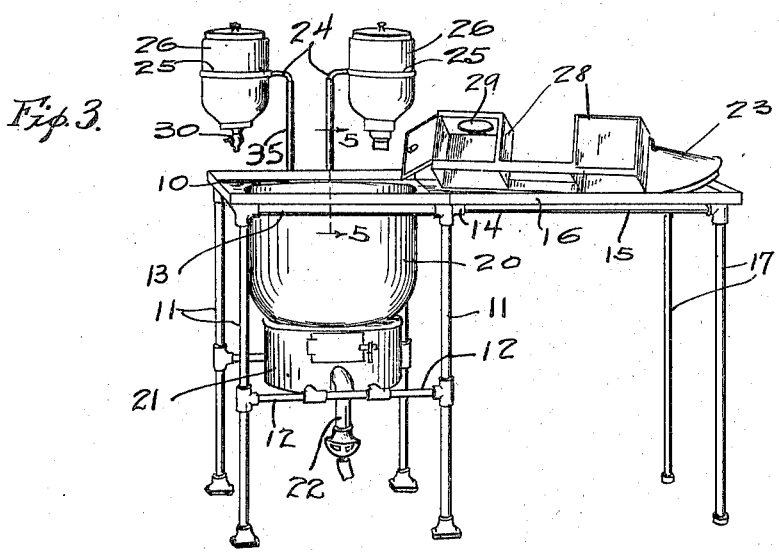
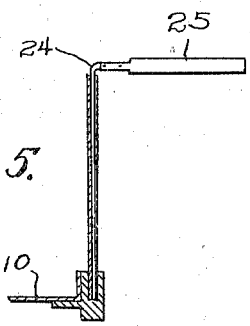
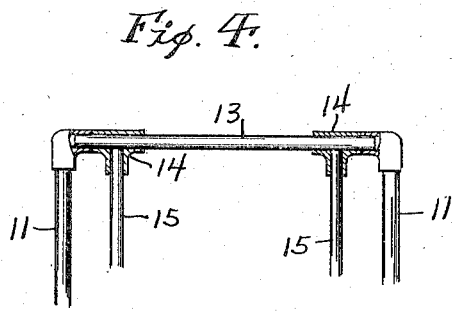
WITNESSES:
INVENTOR
CHARLES A. TRIPP
BY
Lockwood & Lockwood
ATTORNEYS

UNITED STATES PATENT OFFICE.

CHARLES A. TRIPP, OF INDIANAPOLIS, INDIANA, ASSIGNOR TO HOLCOMB & HOKE MANUFACTURING COMPANY, OF INDIANAPOLIS, INDIANA, A CORPORATION.

CORN-CRISP APPARATUS.

1,294,971.   Specification of Letters Patent.   Patented Feb. 18, 1919.

Application filed June 19, 1916.   Serial No. 104,602.

*To all whom it may concern:*

Be it known that I, CHARLES A. TRIPP, a citizen of the United States, and a resident of Indianapolis, county of Marion, and State of Indiana, have invented a certain new and useful Corn-Crisp Apparatus; and I do hereby declare that the following is a full, clear, and exact description thereof, reference being had to the accompanying drawings, in which like letters refer to like parts.

This invention pertains to a device for making corn crisp, including a construction for simplifying the mixing of the molasses or sugar with the popped corn in a heated kettle.

One of the features of the invention is the construction of the support for the device, whereby it may be folded down for packing and shipping, or storing.

Another feature of the invention is the combination of the heating element, a mixing kettle, and the containers for the ingredients to be mixed with the popped corn. This construction makes a compact device of such a nature that the process of making corn crisp is greatly simplified.

The full nature of the invention will be understood from the accompanying drawings and the following description and claims.

Figure 1:
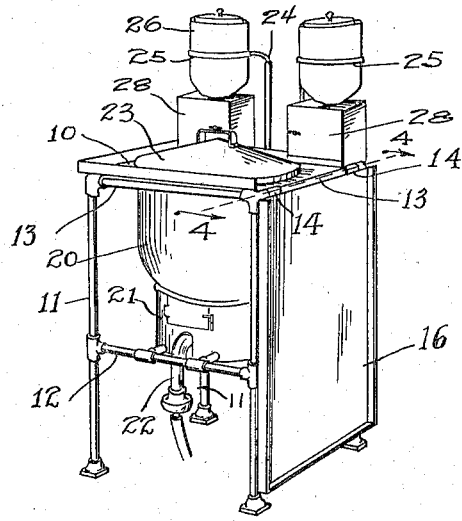
Figure 2:
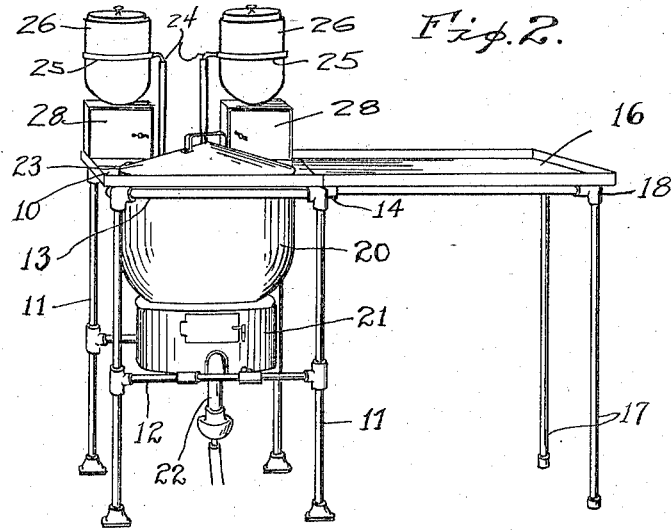

Figure 1 is a perspective view of the device in folded position. Fig. 2 is a perspective view of the device in operative position. Fig. 3 is a perspective view of the device partially dismantled. Fig. 4 is a cross section through one of the supports on the line 4—4 of Fig. 1. Fig. 5 is a vertical section through a part of the table and a container support.

In the drawings there is shown a table 10, having supporting legs 11, with cross braces 12, the table resting on the supporting bars 13. On one of said supporting bars 13 there are hinge members 14, to which are secured supporting bars 15 for supporting the popped corn table 16. There are removable legs 17 adapted to screw into the joints 18 on the supporting bars 15, so that said legs may be removed therefrom when it is desired that the popped corn table be folded down for packing, shipping, or storing. The tables 10 and 16 have flanges around all of their edges, excepting their adjacent edges, for preventing the corn from falling off. Supported by the table 10 and extending downwardly therefrom there is a mixing kettle 20 having secured beneath the bottom portion thereof a heating element 21 in which there is a gas burner supplied with gas from a gas line 22, which is properly connected with the supply line not shown. Said kettle has a removable top 23 for covering it when not in use.

Secured to the table 10 there are vertical tubes 35 in which rods 24 may telescope vertically and oscillate horizontally and said rods 24 have rings 25 on their ends into which may be seated containers 26, which contain the supply of molasses, sugar or other ingredients necessary for the proper mixture. There are cabinets directly under and enveloping the lower ends of the containers, so that the outlets 30 of said containers will extend into said inclosures, as shown in Figs. 1 and 2. They have doors 29 whereby measuring vessels may be placed in said cabinets and the proper amount of ingredient be withdrawn and mixed with the popped corn in the heating kettle. After the popped corn and the ingredients are placed in the heated kettle, they are stirred until the proper mixture is obtained.

The invention claimed is:

1. A corn crisp device including a table support, a table on said support, a mixing kettle secured to said table and extending downwardly therefrom, vertical tubes on said support, rods vertically and rotatably movable in said tubes, horizontal rings on said rods, and containers supported by said rings near the kettle for containing the ingredients to be used in the kettle for preparing the corn crisp.

2. A corn crisp device including a table support, a table on said support, a mixing kettle secured to said table and extending downwardly therefrom, vertical tubes on said support, rods in said tubes, ring members carried by said rods, containers mounted on said ring members near said kettle, and inclosures surrounding the outlets of said containers and provided with doors for inserting a cup below the containers to receive their contents.

3. A corn crisp device including a table support, a table on said support, a mixing kettle secured to said table and extending downwardly therefrom, containers mounted on said table near said kettle so as to be vertically movable and horizontally oscillatory, and inclosures surrounding the outlets of said containers and provided with doors for inserting a cup below the containers to receive their contents, said inclosures being secured together and separable from the table.

In witness whereof, I have hereunto affixed my signature.

CHARLES A. TRIPP.

Copies of this patent may be obtained for five cents each, by addressing the "Commissioner of Patents, Washington, D. C."